United States Patent
D'Souza

(10) Patent No.: US 7,721,286 B2
(45) Date of Patent: *May 18, 2010

(54) PREEMPTIVE MULTI-TASKING WITH COOPERATIVE GROUPS OF TASKS

(75) Inventor: David D'Souza, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 1196 days.

This patent is subject to a terminal disclaimer.

(21) Appl. No.: 11/213,261

(22) Filed: Aug. 26, 2005

(65) Prior Publication Data

US 2005/0283785 A1    Dec. 22, 2005

Related U.S. Application Data

(63) Continuation of application No. 09/537,998, filed on Mar. 29, 2000, now Pat. No. 6,948,172, which is a continuation-in-part of application No. 08/667,377, filed on Jun. 21, 1996, now Pat. No. 6,052,707, which is a continuation of application No. 08/125,930, filed on Sep. 21, 1993, now abandoned.

(51) Int. Cl.
G06F 9/46 (2006.01)

(52) U.S. Cl. .................. 718/100; 718/102

(58) Field of Classification Search .......... 718/102, 718/104, 106, 100

See application file for complete search history.

(56) References Cited

U.S. PATENT DOCUMENTS

| | | | | |
|---|---|---|---|---|
| 4,980,824 A | * | 12/1990 | Tulpule et al. | 718/106 |
| 5,826,080 A | * | 10/1998 | Dworzecki | 718/103 |
| 5,944,778 A | * | 8/1999 | Takeuchi et al. | 718/100 |
| 6,052,707 A | * | 4/2000 | D'Souza | 718/106 |
| 6,282,560 B1 | * | 8/2001 | Eilert et al. | 718/100 |
| 6,971,101 B1 | * | 11/2005 | Clayton et al. | 718/103 |

OTHER PUBLICATIONS

Notes (lecture Notes "non-preemptive scheduling", May 29, 2000, pp. 1-9).*
Prosise ("windows Multitasking", PC Magazine, May 1994, pp. 261-264).*
Stinson (running windows 3.1, third edition, Microsoft, 1992 ).*
Pietrek (Windows internals, the implementation of the windows operating environment, Addison- Wesley publishing company,1993, pp. 213-230, and 252-257).*
Bannister et al. "Task allocation in fault tolerant distributed system", Acta informancia, 1983, pp. 261-281).*

* cited by examiner

*Primary Examiner*—Meng-Ai An
*Assistant Examiner*—Caroline Arcos

(57) ABSTRACT

An operating system combines preemptive scheduling with cooperative or non-preemptive scheduling. In particular, tasks are divided into groups of interdependent tasks. Interdependent tasks are tasks that utilize the same modules of code or resources Each group includes tasks that should not be run asynchronously relative to each other. The scheduler in the operating system provides each group with a time slot of processor time. The tasks within the group are cooperatively scheduled to exploit the time slot assigned to the group. Dependencies between modules and tasks are maintained to assure that no difficulties arise amongst preemptively scheduled groups.

18 Claims, 11 Drawing Sheets

PREEMPTIVE MULTI-TASKING WITH COOPERATIVE GROUPS OF TASKS

CROSS-REFERENCE TO RELATED APPLICATIONS

This application is a Continuation of prior U.S. application Ser. No. 09/537,998, filed Mar. 29, 2000, which is a Continuation-In-Part of prior U.S. application Ser. No. 08/667,377, filed Jun. 21, 1996 (now issued as U.S. Pat. No. 6,052,707), which is a File Wrapper Continuation of U.S. application Ser. No. 08/125,930, filed Sep. 21, 1993, priority from the filing date of which is hereby claimed under 35 U.S.C. §120.

FIELD OF INVENTION

The present invention relates generally to data processing systems and, more particularly, to scheduling of tasks in data processing systems.

BACKGROUND

The Microsoft WINDOWS, Version 3.1, operating system sold by Microsoft Corporation of Redmond, Wash., is a message-driven operating system. Each program run on the operating system maintains a message queue for holding incoming messages that are destined for some portion of the program. Messages are often destined to windows generated by the program. Each window generated by a program has an associated procedure. Thus, the messages are not sent to the window per se, but rather are sent to the associated procedure.

Messages are retrieved and processed from the message queue by the associated program through execution of a block of code known as the "message loop". FIG. 1 is a flow chart of the steps performed by the message loop. These steps are continuously repeated in a looping fashion while the program is active. Initially, a message is retrieved from the queue by making a call to the GetMessage function (step 10). The GetMessage function is responsible for retrieving a message (if one exists) from the queue. Once the message is retrieved from the queue, the message is translated (if necessary) into a usable format by calling the TranslateMessage function, which performs some keyboard translation (step 12). Once the message is translated, the message is dispatched to the appropriate procedure by calling the DispatchMessage function (step 14). The message includes information that identifies a destination window. The information is used to properly dispatch the message.

The GetMessage function, described above, also plays a role in the scheduling of tasks in the Microsoft WINDOWS, Version 3.1, operating system. The operating system adopts a non-preemptive or cooperative multi-tasking approach. A task is a section of code, such as a subroutine or program, that can run independently. Cooperative multi-tasking refers to when tasks cooperate with each other by voluntarily passing control over a processor ("yielding") among each other. With preemptive multi-tasking, in contrast, a scheduler determines which task is given the processor and typically provides each task with a given time slot in which it may run. The GetMessage function is an example of a vehicle for implementing the cooperative multi-tasking in the operating system. Other operating system-provided functions that help implement cooperative multi-tasking include the PeekMessage, Yield and WaitMessage functions. In order to understand how the GetMessage function and the other named functions play a role in cooperative multi-tasking, it is helpful to take a closer look at the operation of the GetMessage function.

FIG. 2 is a flow chart of the steps performed by the GetMessage function when called from a first task (e.g., program) in an environment having multiple active tasks. Initially, the GetMessage function determines whether the message queue for the calling task is empty (step 16). If the message queue for the calling task is empty, the task yields (i.e., relinquishes control of) the processor to a second task that has a non-empty message queue (step 18). At some later point in time, a message becomes available in the message queue of the first task (step 20). The second task maintains control of the processor until it yields control to another task. Eventually, a task yields control back to the first task (step 22). Typically, one of the other tasks yields control back to the first task when the other task's message queue is empty, and the message queue for the first task is no longer empty. The message in the message queue of the first task is then retrieved from the message queue (step 24). On the other hand, if in step 16 it is determined that the message queue for the first task is not empty, the step of retrieving the message from the message queue is performed immediately (step 24) rather than after first performing steps 18, 20 and 22.

One difficulty with the cooperative multi-tasking approach of the Microsoft WINDOWS, Version 3.1, operating system is that a task may monopolize the processor by refusing to yield to other tasks. As long as the task has messages in its message queue, it need not yield.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with a first aspect of the present invention, a method is practiced in a data processing system having at least one processor for running tasks. The tasks are logically partitioned into groups of interdependent tasks that utilize the same modules of code or resources. The groups of tasks are preemptively scheduled to be run such that each group of tasks is given a time slot in which it may run on the processor. The tasks to be run within each group are non-preemptively scheduled to be run during the time slot allocated to the group.

In accordance with a further aspect of the present invention, a method is practiced in a data processing system having at least one storage device for storing modules of code and at least one processor for running tasks. During the running of each task, at least one module of code is run and resources may be allocated. In this method, a task dependency list is provided for each task. This task dependency list lists modules and resources that are candidates to be called when the task is run on the processor. The method may include the additional step of providing a module and resource dependency list for each module of code. Each module and resource dependency list lists interdependent modules of code for the module code associated with the list and resources utilized by the module code associated with the list. In such a case, the task dependency list for each task is created by taking a logical union of the modules listed in the module and resource dependency list that are candidates to be called when the task is run on the processor. The task dependency lists are examined to logically partition the tasks into groups of interdependent tasks. The groups of tasks are preemptively scheduled to be run such that each group of tasks is given a time slot in a cycle in which its tasks may run on the processor. For each group of tasks, the tasks are non-preemptively scheduled to be run during the time slot allocated to the group.

In accordance with a still further aspect of the present invention, a data processing system includes a partitioning mechanism for partitioning tasks into groups of interdependent tasks. The data processing system also includes an execution mechanism for executing the task. A preemptive scheduler preemptively schedules the group of tasks such that each group is given a time slot in which to execute one of its tasks. A non-preemptive scheduler is also provided in the data processing system for non-preemptively scheduling tasks within each group.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

While illustrative embodiments have been illustrated and described, it will be appreciated that various changes can be made therein without departing from the spirit and scope of the invention.

The preferred embodiment of the present invention combines preemptive multi-tasking with cooperative multi-tasking to optimize scheduling of tasks in an operating system. Specifically, tasks are logically divided into groups of interdependent tasks. As will be explained in more detail below, the interdependent tasks are related such that if they were scheduled asynchronously, resource sharing problems could arise. A time slot of processor time is provided for each group. Scheduling within the group, however, is performed in a cooperative manner, much like that performed by the Microsoft WINDOWS, Version 3.1, operating system, sold by Microsoft Corporation of Redmond, Wash. Since groups are preemptively scheduled, one task may not monopolize the processor and slow down all executing tasks. In general, response time for task completion is improved by the present invention. Furthermore, if a task hangs, the scheduler may switch to another group so that all tasks will not hang. In addition, for compatibility reasons, the present invention ensures that dependencies among tasks are not ignored. Earlier versions of the Microsoft WINDOWS operating system used cooperative multi-tasking. Thus, applications written for such earlier versions of the operating system do not account for preemptive scheduling and, thus, dependency problems may arise when such applications are run in a preemptively scheduled environment. Failure to recognize these dependencies could cause problems in a purely preemptively scheduled environment.

Figure 1:
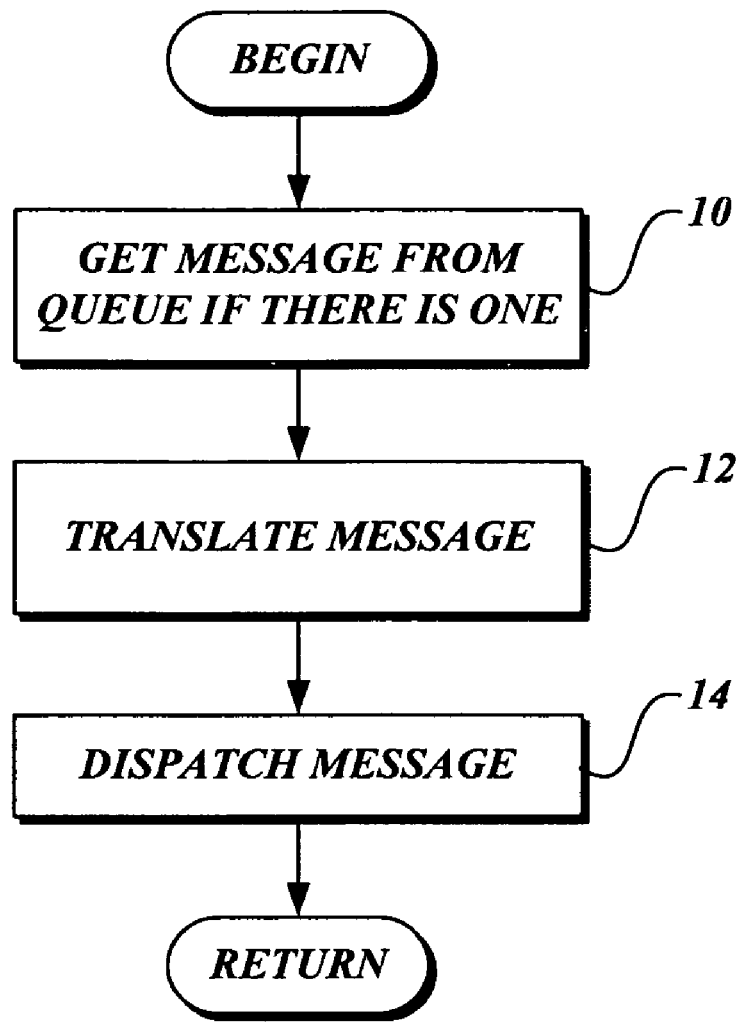
FIG. 1 is a flow chart illustrating the steps performed by a message loop in the Microsoft WINDOWS, Version 3.1, operating system.
Figure 2:
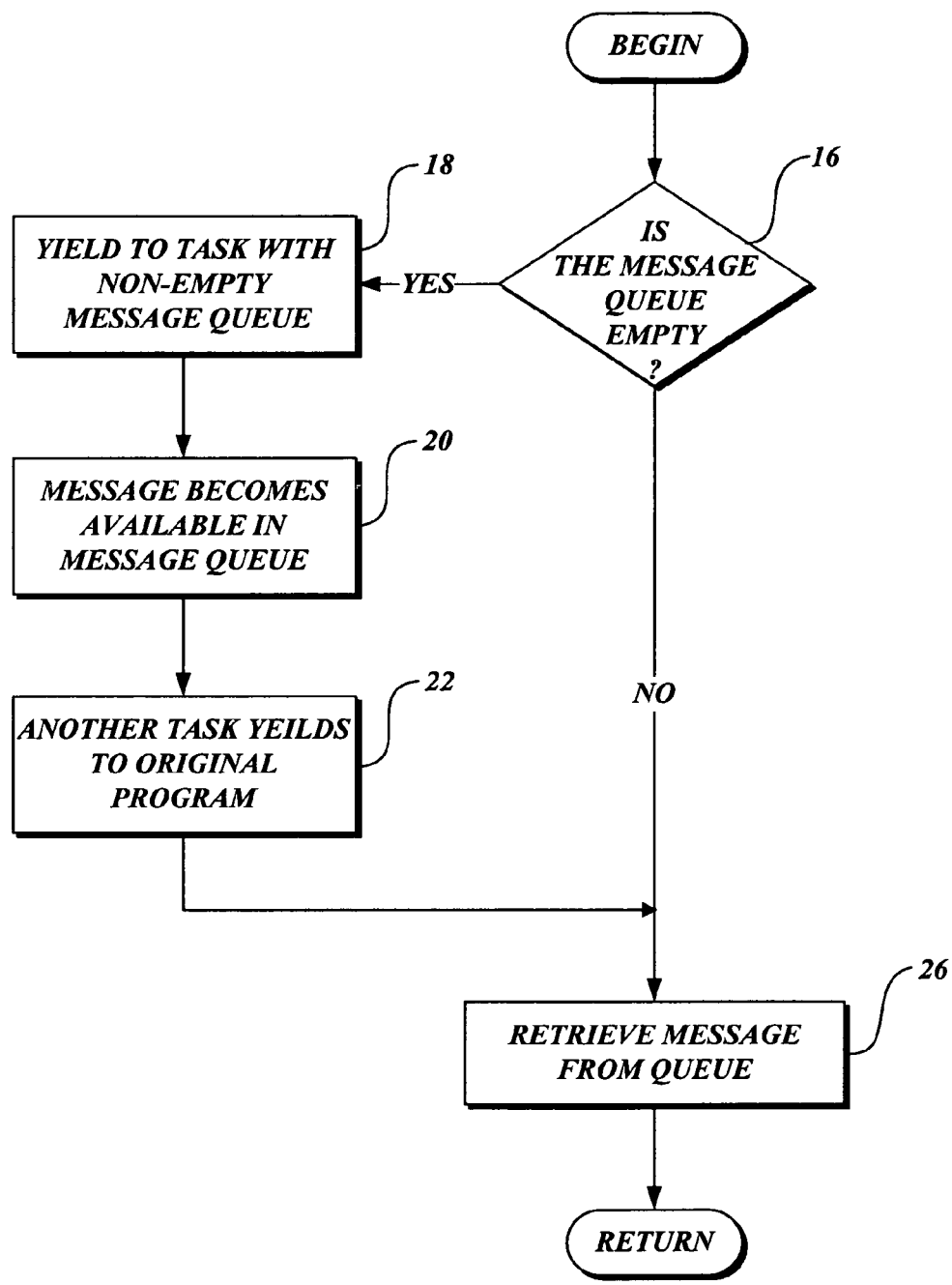
FIG. 2 is a flow chart illustrating the steps performed by the GetMessage function of the message loop of FIG. 1.
Figure 3:
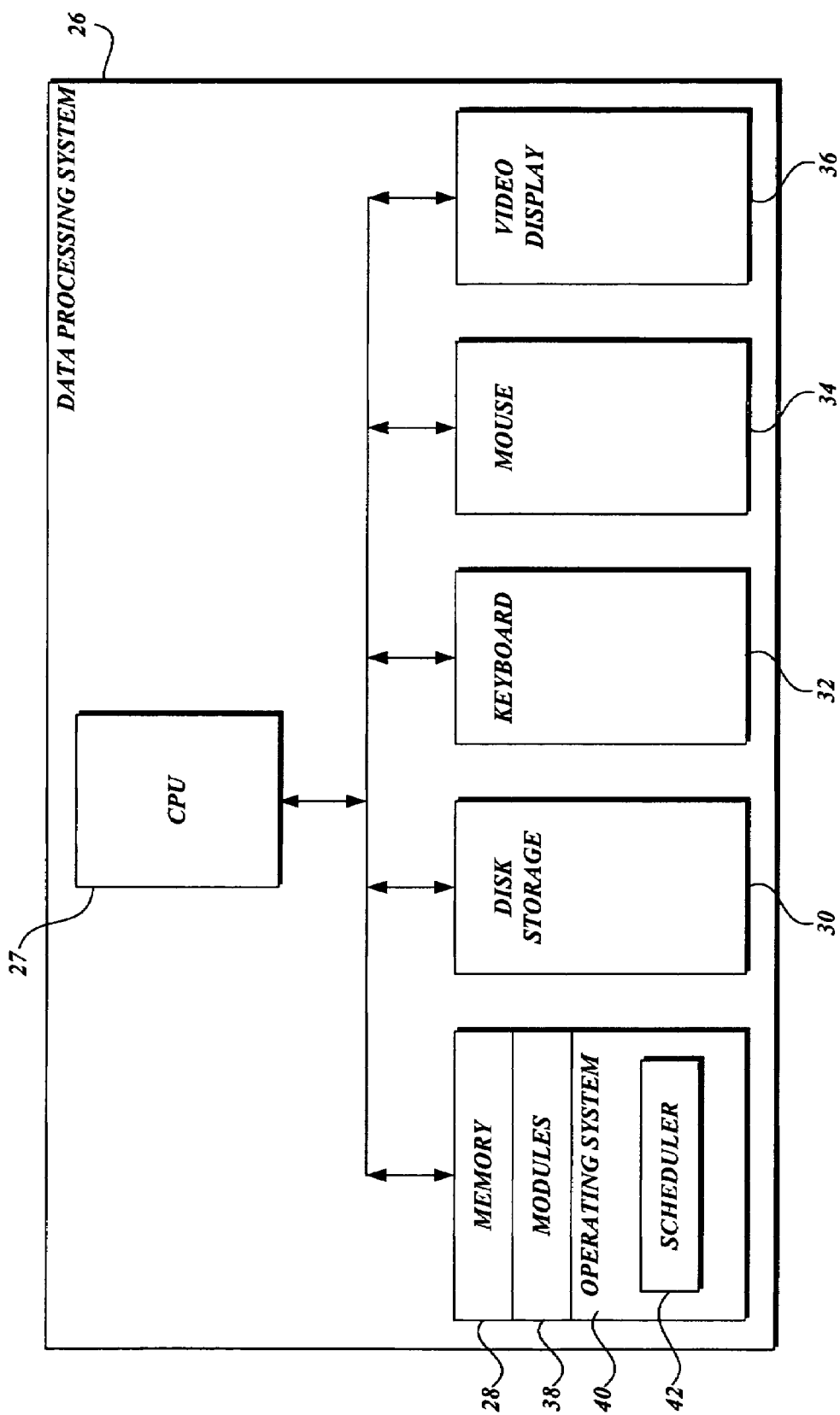
FIG. 3 is a block diagram of a data processing system that is suitable for practicing a preferred embodiment of the present invention.

The preferred embodiment of the present invention is practiced in a data processing system 26, like that shown in FIG. 3. Although the data processing system 26 shown in FIG. 3 is a single processor system, those skilled in the art will appreciate that the present invention may also be practiced in multiple processor systems, such as distributed systems. The data processing system 26 of FIG. 3 includes a central processing unit (CPU) 27 that controls operation of the system. The data processing system 26 also includes a memory 28 and disk storage 30 for storing files and data. The memory 28 may include any of multiple types of memory devices, including RAM, ROM or other well-known types of memory devices. The data processing system 26 may further include a keyboard 32, a mouse 34 and a video display 36. It should be appreciated that additional or other types of input/output devices may, likewise, be included in the data processing system 26.

The memory 28 holds a copy of an operating system 40 and modules of code 38. The operating system may be an embellished version of the Microsoft WINDOWS, Version 3.1, operating system that has been embellished to support the preferred embodiment described herein. The operating system 40 includes a scheduler 42 that is responsible for scheduling the execution of tasks on the CPU 28. The preferred embodiment of the present invention is implemented, in large part, in the scheduler 42.

Figure 4:
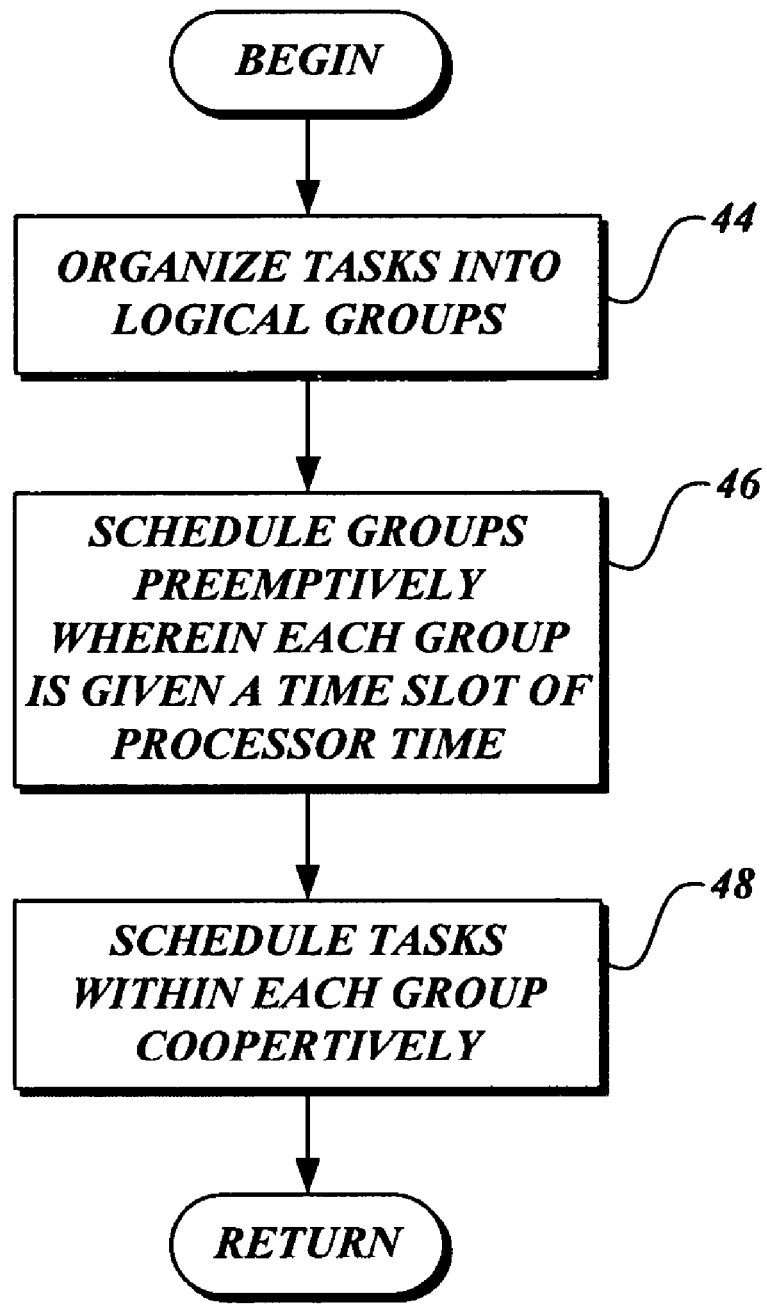
FIG. 4 is a flow chart providing a high level view of the steps performed by the preferred embodiment of the present invention in scheduling tasks for execution.

FIG. 4 is a high level flow chart showing the steps performed in the scheduling of tasks within the preferred embodiment of the present invention. First, tasks are organized into logical groups of interdependent tasks (step 44). These tasks have interdependencies such that they cannot be run in separate time slots. For instance, the tasks may call a common dynamic link library (DLL) module or other common module. If such task were run in separate time slots, a data sharing problem arises. One of the tasks might inadvertently change the data for the DLL and, thus, deleteriously affect the other tasks. Another type of interdependency that may prevent tasks from executing in separate time slots is resource interdependency. A resource is any part of a computer system or a network that may be allocated to a program or a process while it is running. Types of resources may include, but are not limited to, a printer driver, a hardware device, a data store on disk, a memory-mapped file, an Internet port, an input/output port, a computer, an Application Programming Interface ("API") provider, or other service provider. Other types of resources are known to those skilled in the art. The organization of tasks into logical groups based upon their interdependencies is performed by the operating system 40 and will be described in more detail below. The discussion below will initially focus on the preemptively scheduling aspect of the present invention and then later focus on the cooperative scheduling aspect of the present invention.

Figure 5:
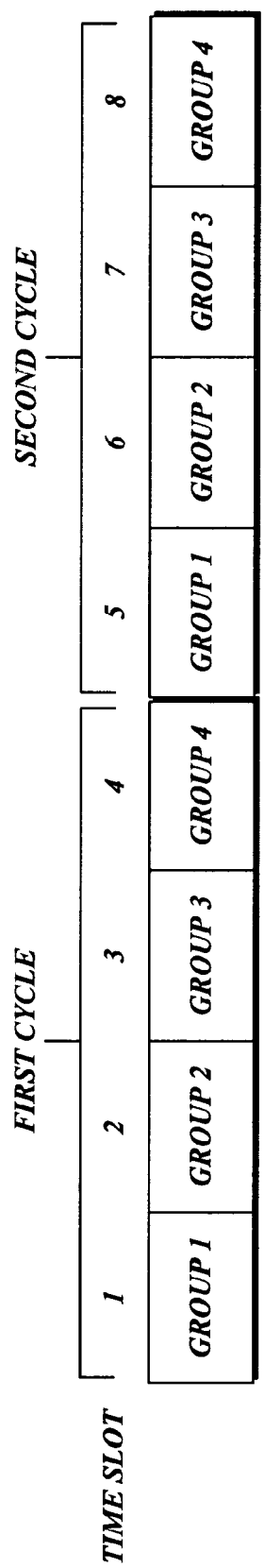
FIG. 5 is a block diagram illustrating an example of preemptive scheduling of groups in the preferred embodiment of the present invention.

The various groups of tasks to be run on the operating system 40 are scheduled preemptively such that each group is given a particular time slot of processing time to run on the CPU 28 (step 46 in FIG. 4). FIG. 5 provides an illustration of how time slots may be assigned in an instance where there are four logical groups: Group 1, Group 2, Group 3, and Group 4. In the illustration shown in FIG. 5, Group 1 is assigned time slot 1 in cycle 1 and then later assigned time slot 5 in cycle 2. In the example shown in FIG. 5, Group 2 is assigned time slot 2 in cycle 1, Group 3 is assigned time slot 3 in cycle 1, and Group 4 is assigned time slot 4 in cycle 1. Each group is assigned a corresponding time slot within the next cycle. Thus, Group 1 is assigned time slot 5 in cycle 2, Group 2 is assigned time slot 6 in cycle 2, Group 3 is assigned time slot 7 in cycle 2, and Group 4 is assigned time slot 8 in cycle 2.

As the scheduling is dynamic and groups may be added and/or removed over time, the sequence of time slots need not remain fixed; rather, the scheduling may change over time. The scheduler 42, however, ensures that each active group gets a time slot in each cycle.

The scheduling of tasks within each group is not performed preemptively; rather, the scheduling is performed cooperatively (step 48 in FIG. 4). As discussed above, cooperative multi-tasking requires that a task voluntarily yield to another task. The example described in the Background section focused on the GetMessage function as a vehicle for yielding amongst tasks. In general, the cooperative multi-tasking performed within a group is performed much like scheduling is performed in the Microsoft WINDOWS, Version 3.1, operating system. As will be described in more detail below, the present invention additionally checks for dependencies before unblocking a task. API's such as GetMessage, PeekMessage, Yield and WaitMessage allow applications to yield to other tasks in the same group.

In summary, each group is given a time slot of processor time in each cycle. Which task runs during the time slot assigned to a group depends upon cooperative scheduling of the tasks within the group. Thus, a task that is currently running for a group will continue to run during each consecutive time slot that is assigned to the group until the task yields to another task in the group through a vehicle such as a GetMessage function call.

Figure 6:
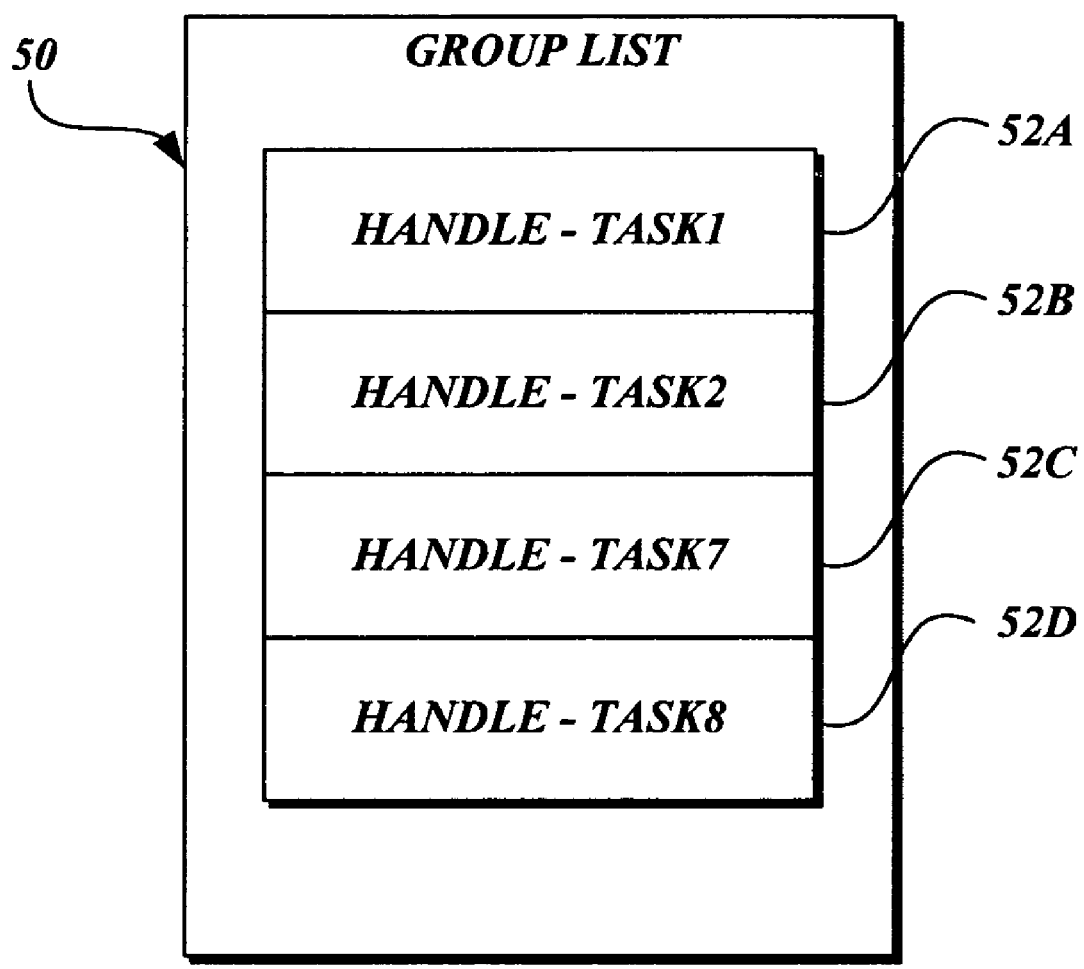
FIG. 6 is an illustration of an exemplary group list employed in the preferred embodiment of the present invention.

The operating system 40 maintains data structures for monitoring what tasks are in each group. The primary data structure for this purpose is the group list 50 (FIG. 6). The group list 50 may be stored in the data area of the operating system 40 in memory 28. The group list 50 includes a respective entry 52A, 52B, 52C, and 52D for each of the tasks included in the group. Each entry 52A, 52B, 52C, and 52D holds a handle for a task that is part of the group. A handle is a number that uniquely identifies a task amongst those in the system 26. Likewise, a handle may be utilized to uniquely identify resources amongst those in the system 26. In the example shown in FIG. 6, the group list 50 includes entries 52A, 52B, 52C, and 52D for four tasks: task 1, task 2, task 7, and task 8.

Figure 7:
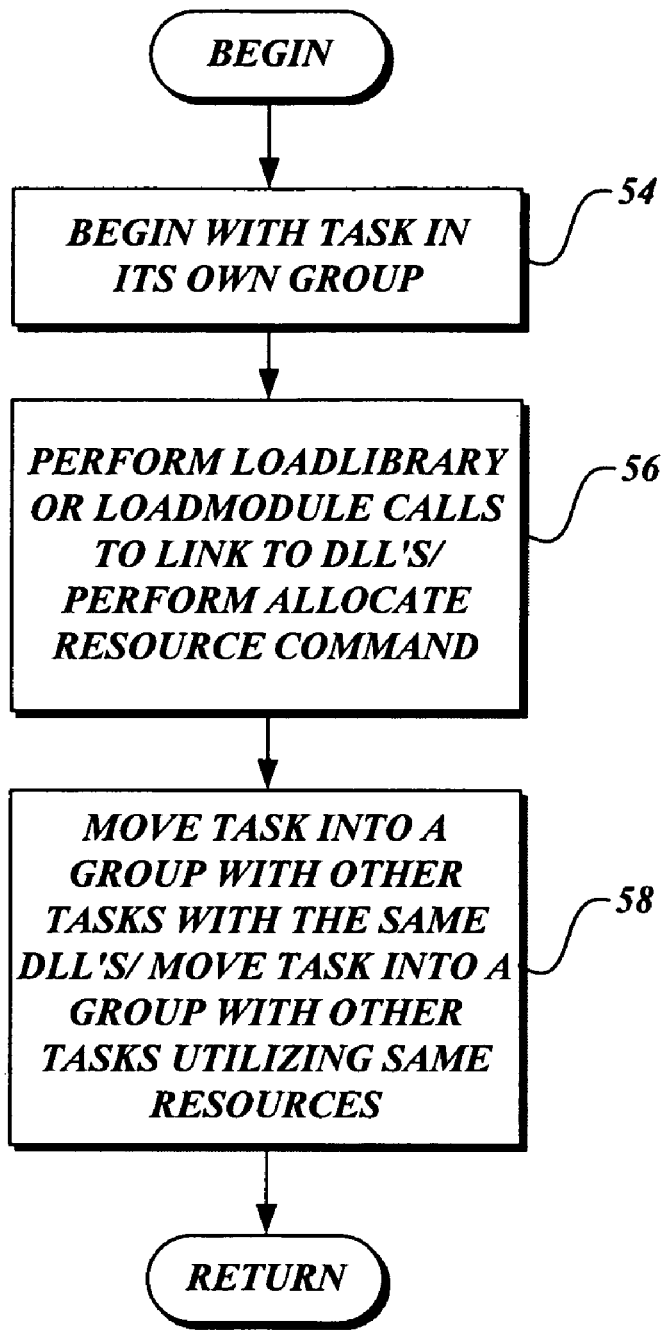
FIG. 7 is a flow chart illustrating the steps performed to merge tasks into a single merged group in the preferred embodiment of the present invention.

The tasks included in group lists may change over time. FIG. 7 is a flow chart illustrating the steps performed to merge groups. Initially, a task begins in its own group (step 54). During the course of execution of the task, the task performs API calls, such as LoadLibrary, LoadModule, WinExec, or certain forms of SendMessage, to link to DLLs (step 56). The operating system 40 moves the task into a group with other applications which use the same DLLs to avoid data sharing problems (step 58). Likewise, during execution of a task, the task may request a resource (step 56) using an allocate resource command. The operating system 40 moves the task into a group with other applications which use the same resource to avoid resource sharing problems (step 58).

Figure 8:
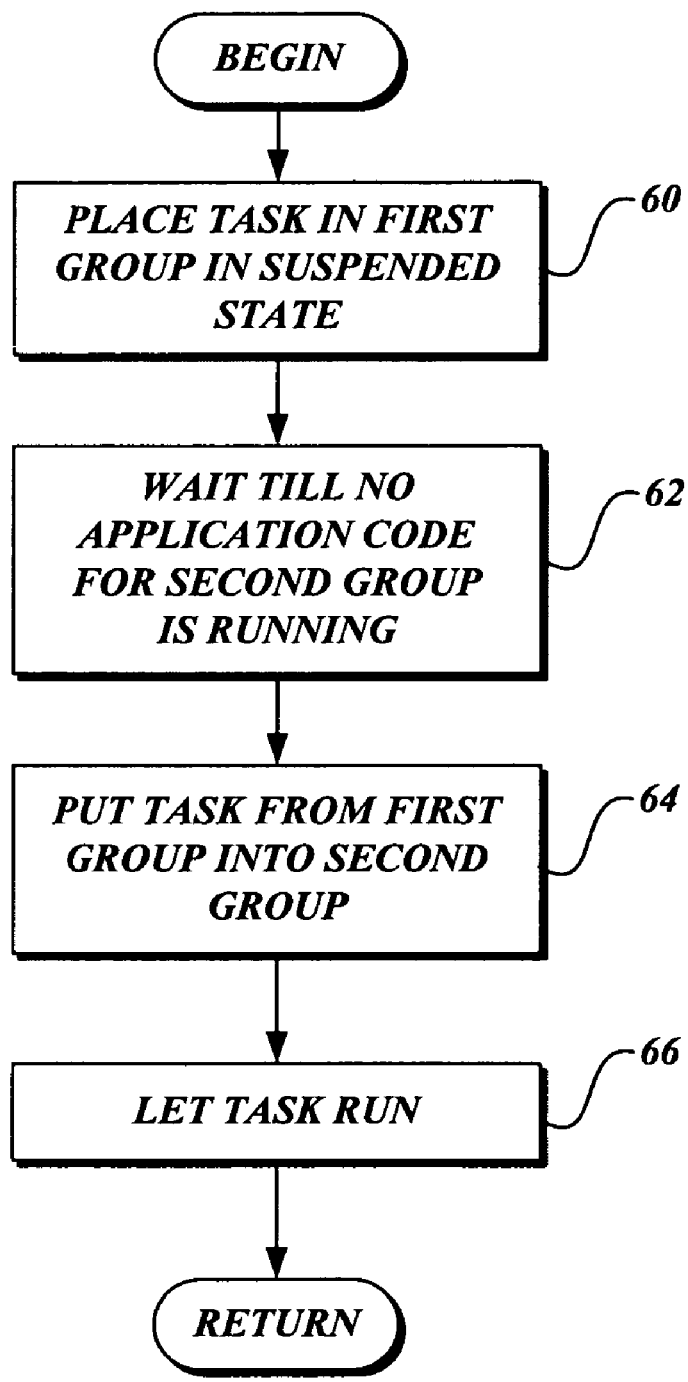
FIG. 8 is a flow chart illustrating in more detail the steps performed to move a task into a group with other tasks which use a same DLL or a same resource in the preferred embodiment of the present invention.

FIG. 8 is a flow chart illustrating in more detail how step 58 of FIG. 7 is performed to move a task into a group with other tasks. The application to be moved from a first group into a second group is placed into a suspended state, instead of immediately returning from the LoadLibrary, LoadModule or Allocate Resource APIs (step 60). The first group is in the "synching-up state" at this point. The operating system 40 waits till no application code for the second group is running (step 62). In other words, it waits till each of the tasks in Group 2 is calling an API like GetMessage, WaitMessage or Yield. The task from the first group is then added to the second group (step 64) and the task may then be scheduled to run (step 66).

Figure 9:
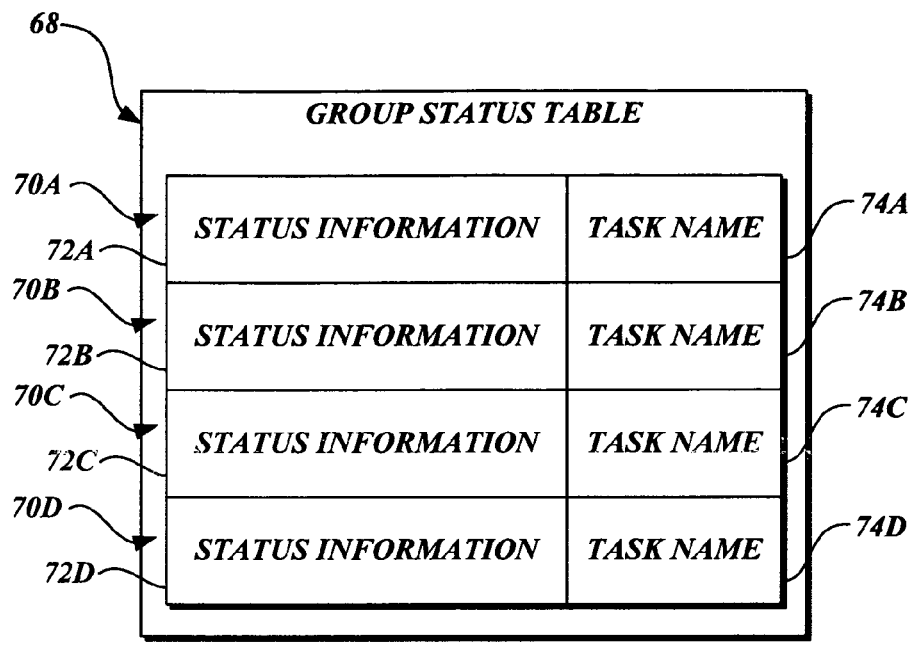
FIG. 9 is an illustration of an exemplary group status table used in the preferred embodiment of the present invention.

In order for the scheduler 42 to properly allocate time slots to groups, it must know the current status of each group and which task, if any, is scheduled for execution during the next time slot that is provided for the group. A group status table 68, like that shown in FIG. 9, is stored by the operating system 40 in memory 28 in order to assist the scheduler 42 in preemptively scheduling tasks from the various groups. In the example shown in FIG. 9, the system 26 currently has four active groups of tasks. A separate entry 70A, 70B, 70C, and 70D is provided for each group. Each of the entries 70A, 70B, 70C, and 70D includes a status field 72A, 72B, 72C, and 72D, respectively. The status fields 72A, 72B, 72C, and 72D hold status information that details whether one of the tasks in the respective groups is scheduled to be running during the next time slot or whether the group is in a "synching-up" state (which will be described in more detail below). The status information may be encoded as groups of bits held in the status fields 72A, 72B, 72C, and 72D. Each entry 70A, 70B, 70C, and 70D also includes a respective task name field 74A, 74B, 74C, and 74D. The task name fields 74A, 74B, 74C, and 74D hold the task names of any tasks that are running during the next available time slot for the groups. Thus, if entry 70A holds status information for group 1, the task name field 74A holds a name (or handle) of the task in group 1 that is running.

Figure 10:
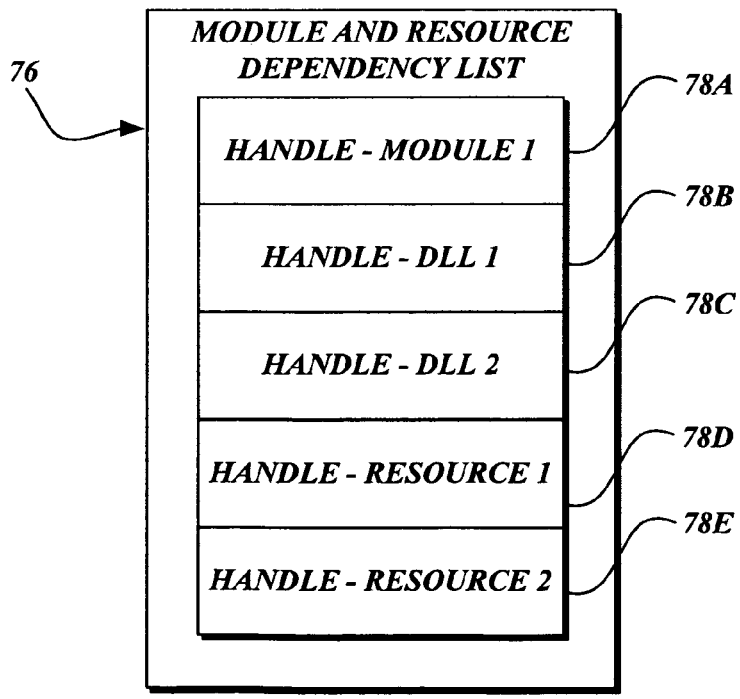
FIG. 10 is an illustration of an exemplary module and resource dependency list used in the preferred embodiment of the present invention.

The operating system 40 also maintains a module and resource dependency list for each of the modules 38. The module and resource dependency list serves a role in assigning tasks/modules to groups when a new task or module is added to a group and when it is determined which group a task will be added to. The module and resource dependency lists are examined to determine what group a task should be assigned. Preemptively scheduled groups always have disjoint module and resource dependency lists. A task/module is put in its own group or in a group with interdependent tasks/modules and resource usage. An example module and resource dependency list 76 is shown in FIG. 10. Each task may include a single module or multiple modules. The module and resource dependency list 76 lists modules that are candidates to be called or loaded from the associated module. The listed modules and the associated module have an interdependency. The module and resource dependency list 76 holds entries 78A, 78B, and 78C for each of modules called or loaded from the module associated with the list. In FIG. 10, the module calls or loads module 1, DLL 1, and DLL 2. Furthermore, the module and resource dependency list 76 lists resources that are candidates to be utilized by the associated module. The resources and the associated module therefore have an inter-dependency. The module and resource dependency list 76 holds entries 78D and 78E for each of the resources allocated by the module associate with the list. In FIG. 10, the module allocates RESOURCE 1 and RESOURCE 2.

Figure 11:
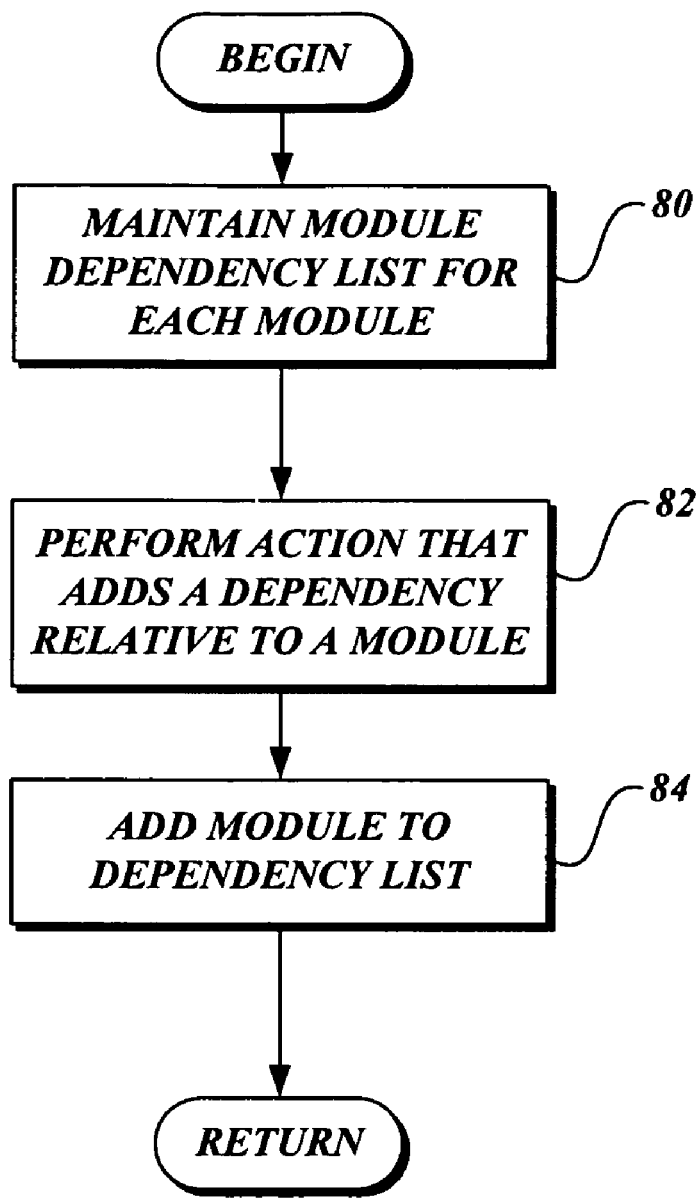
FIG. 11 is a flow chart illustrating the steps performed to grow a module and resource dependency list in the preferred embodiment of the present invention.

The module and resource dependency list 76 is not static; rather the list changes over time. FIG. 11 is a flow chart illustrating the steps performed to update a module and resource dependency list 76 during the course of execution of the associated module. Initially, a module and resource dependency list is maintained for each module (step 80). An action is then performed that adds a module or resource dependency relative to the module associated with the list (step 82). This action may include, for instance, loading a library module, loading a DLL module, running an application module, getting the address of an exported DLL module, or allocating a resource like a printer or disk drive. In the Microsoft WINDOWS, Version 3.1, operating system, API calls such as LoadLibrary, LoadModule, GetProcAddress, WinExec, and AllocateResource add a dependency relative to a module. The new modules that are loaded, run or exported by such API calls are then added to the module and resource dependency list (Step 84). Likewise, the new resources allocated by the module are also added to the module and resource dependency list. In this fashion, the module and resource dependency list may dynamically grow during the course of execution of the associated module.

Figure 12:
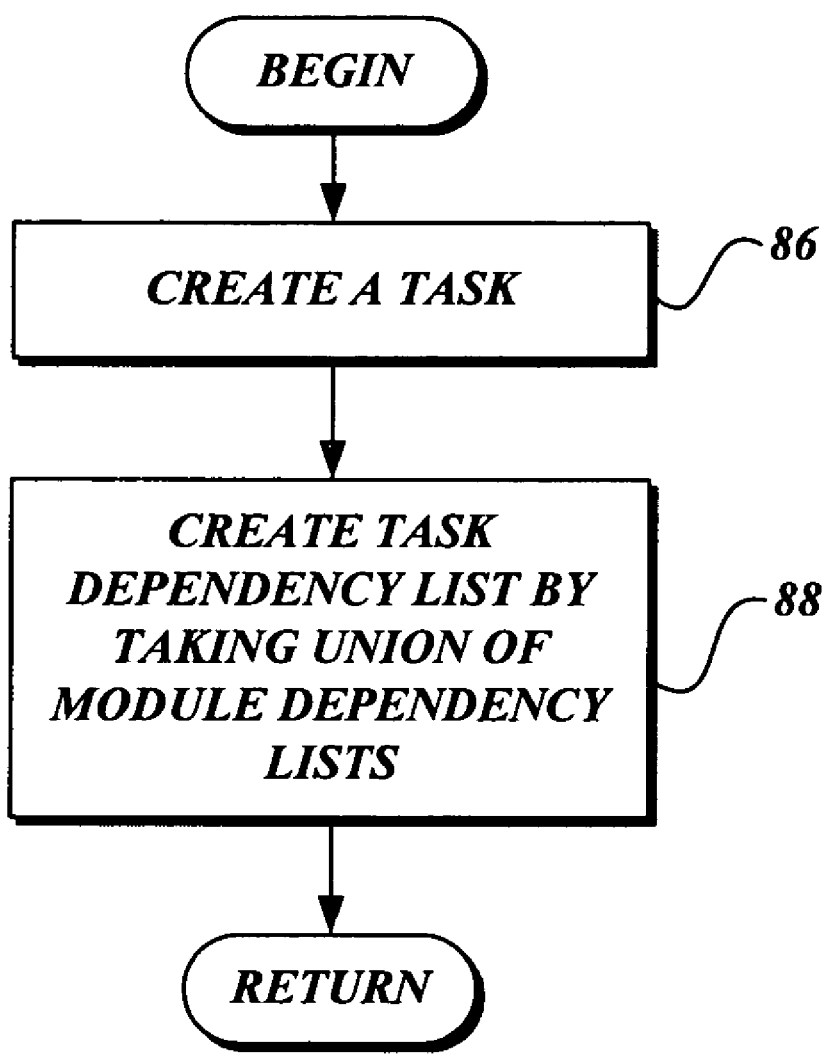
FIG. 12 is a flow chart illustrating the steps performed to create a task dependency list in the preferred embodiment of the present invention.

Since any task may utilize multiple modules and resources, the issue arises how to develop a module and resource dependency list for a task. FIG. 12 is a flow chart showing the steps performed to create a module and resource dependency list for a task. Initially, a task is created (step 86). A task dependency list for the task is then created by taking the union of the module and resource dependency list of the modules of the task (step 88). In this fashion, the preferred embodiment in the present invention ensures that all of the module and resource dependencies for a task are taken into account when assigning the task a group.

It is perhaps helpful to summarize the scheduling performed by the scheduler 42. The scheduler 42 assigns time slots for each of the active groups. The scheduler 42 must also determine which task within a group is to be executed or whether the group is in a synching-up state. The currently running task is specified within task name fields 74A, 74B, 74C, and 74D (FIG. 9) of entries 70A, 70B, 70C, and 70D of the group status table 68. The APIs GetMessage, PeekMessage, Yield, and WaitMessage are embellished in the preferred embodiment of the present invention to update the group status table when yielding or blocking. Thus, the group status table 68 contains current information and the appropriate task in each group is scheduled.

While the present invention has been described with reference to a preferred embodiment thereof, those skilled in the art will appreciate that various changes in form and scope may be made without departing from the present invention as defined in the appended claims. For example, the present invention is well suited for use in a distributed system. Moreover, the present invention may be implemented in environments other than the Microsoft WINDOWS, Version 3.1, operating system. Still further, the present invention need not use a single scheduler; rather, multiple schedulers may be used in conjunction.

The embodiments of the invention in which an exclusive property or privilege is claimed are defined as follows:

1. In a data processing system having at least one processor for running tasks and resources available to tasks, a method comprising:
   logically partitioning tasks into groups of tasks that utilize at least one same resource by initially placing each task in its own group and subsequently merging tasks that allocate the at least one same resource into the groups of tasks;
   preemptively scheduling the groups of tasks to be run such that each group of tasks is given a time slot in a cycle in which each group's tasks are scheduled to run on the at least one processor; and
   non-preemptively scheduling tasks within each group to be run during the time slot given to the group.

2. The method recited in claim 1 wherein the data processing system includes at least one storage device and the method further comprises storing a group list for each said group of tasks in the storage device, wherein each group list includes identifying information for tasks in a corresponding said group of tasks.

3. The method recited in claim 1, further comprising storing status information for each said group of tasks in the storage device, wherein the status information includes information indicating whether a corresponding said group of tasks has a task that is running and the identifying information for the task that is running.

4. The method recited in claim I wherein the at least one same resource includes a component of the data processing system configured to be allocated to tasks running on the at least one processor.

5. The method recited in claim 1 wherein the at least one same resource includes one of a printer driver, a hardware device, a data store on disk, a memory-mapped file, an Internet port, an input/output port, a computer, and a service provider, wherein the service provider includes an Application Programming Interface ("API") provider.

6. In a data processing system having at least one resource that may be allocated to tasks, and at least one processor for running tasks, wherein running a task includes allocating at least one resource to the task, a method comprising:
   providing a task dependency list for a task, the task dependency list listing resources that are candidates to be allocated to the task;
   examining the task dependency lists to logically partition the tasks into groups of interdependent tasks by initially placing each task into its own group, identifying interdependencies between the task, and merging the tasks based on the interdependencies to form the groups of interdependent tasks;
   preemptively scheduling the groups of interdependent tasks to be run such that each group of interdependent tasks is given a time slot in a cycle in which each group's tasks are configured to run on the processor; and
   for each group of interdependent tasks, non-preemptively scheduling tasks to be run within each group during the time slot given to the group.

7. The method recited in claim 6, wherein the data processing system includes at least one storage device and the method further comprises storing in the at least one storage device a group list for each said group of interdependent tasks that holds identifying information for tasks included in a corresponding said group of interdependent tasks.

8. The method recited in claim 6, further comprising storing in the at least one storage device status information for each group of interdependent tasks indicating a corresponding said group of interdependent tasks has a task that is running and holding identifying information for the task that is running.

9. The method recited in claim 6 wherein the resources that are candidates to be allocated to the task include any part of a computer system or a network configured to be allocated to the task.

10. The method recited in claim 6 wherein the resources that are candidates to be allocated to the task include at least one of a printer driver, a hardware device, a data store on disk, a memory-mapped file, an Internet port, an input/output port, a computer, and a service provider, wherein the service provider includes an Application Programming Interface ("API") provider.

11. A device comprising:
storage;
one or more modules in the storage that, when executed by one or more processors, implement a scheduler to schedule tasks to run in an operating system, the scheduler configured to:
maintain a dynamic task dependency list for a task, the dynamic task dependency list having at least one entry representing a particular resource upon which the task depends;
assign the task to a group of tasks based on the dynamic task dependency list, wherein each task assigned to the group of tasks depends on the particular resource and is initially placed into its own group, the group of tasks being formed by merging tasks that allocate the particular resource based on dynamic task dependency lists maintained for each of the tasks;
assign a range of time to the group of tasks, during which range of time the group's tasks are allowed to run; and
cooperatively schedule the group's tasks to run during the range of time to which the group was assigned.

12. The device recited in claim 11, wherein the scheduler is configured to maintain the dynamic task dependency list for the task by determining one or more resources upon which the task currently depends, and creating the entries representing the one or more resources upon which the task currently depends.

13. The device recited in claim 11, wherein the particular resource upon which the task depends includes a component of a data processing system configured to be allocated to the task.

14. The device medium recited in claim 11, wherein the particular resource upon which the task depends includes one of a printer driver, a hardware device, a data store on disk, a memory-mapped file, an Internet port, an input/output port, a computer, and a service provider, wherein the service provider includes an Application Programming Interface ("API") provider.

15. The device recited in claim 11, wherein the particular resource upon which the task depends includes a module called during execution of the task.

16. The device recited in claim 11, wherein the range of time is a particular time slot of a cycle of processing time on a processor.

17. The device recited in claim 11, wherein the scheduler is configured to cooperatively schedule the group's tasks to run during the range of time to which the group was assigned by running a currently active task in the group of tasks during the range of time to which the group was assigned until the currently active task yields to another task in the group.

18. The device recited in claim 11, wherein the scheduler is further configured to generate a group list for said group of tasks, wherein the group list includes identifying information for each task assigned to the group of tasks.

* * * * *